(12) United States Patent
Beers et al.

(10) Patent No.: US 8,931,304 B2
(45) Date of Patent: Jan. 13, 2015

(54) CENTRIFUGAL COMPRESSOR COOLING PATH ARRANGEMENT

(75) Inventors: Craig M. Beers, Wethersfield, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1057 days.

(21) Appl. No.: 12/839,680

(22) Filed: Jul. 20, 2010

(65) Prior Publication Data

US 2012/0017617 A1  Jan. 26, 2012

(51) Int. Cl.
| | | |
|---|---|---|
| *F25B 1/10* | (2006.01) | |
| *B64D 13/00* | (2006.01) | |
| *F25B 31/00* | (2006.01) | |
| B64D 13/06 | (2006.01) | |
| F25B 1/053 | (2006.01) | |

(52) U.S. Cl.
CPC .............. *B64D 13/00* (2013.01); *F25B 31/008* (2013.01); *B64D 2013/0674* (2013.01); *F25B 1/053* (2013.01)
USPC ............... 62/510; 62/505; 417/350; 417/369; 417/370

(58) Field of Classification Search
USPC ..................... 62/118, 510, 505, 259.2, 209; 417/423.8, 423.5, 350, 369, 370, 523.8
See application file for complete search history.

(56) References Cited

U.S. PATENT DOCUMENTS

| | | | |
|---|---|---|---|
| 3,805,547 A | 4/1974 | Eber | |
| 4,211,093 A | 7/1980 | Midolo | |
| 5,350,039 A * | 9/1994 | Voss et al. ................. 184/6.16 |
| 5,473,899 A | 12/1995 | Viteri | |
| 5,603,227 A | 2/1997 | Holden et al. | |
| 5,857,348 A * | 1/1999 | Conry .......................... 62/209 |
| 5,899,091 A | 5/1999 | Fraser, Jr. et al. | |
| 5,980,218 A | 11/1999 | Takahashi et al. | |
| 6,196,809 B1 | 3/2001 | Takahashi et al. | |
| 6,390,789 B1 * | 5/2002 | Grob et al. ................. 417/350 |
| 6,450,781 B1 | 9/2002 | Petrovich et al. | |
| 6,631,617 B1 * | 10/2003 | Dreiman et al. .............. 62/84 |
| 6,675,594 B2 | 1/2004 | Choi et al. | |
| 7,240,515 B2 * | 7/2007 | Conry .......................... 62/510 |

(Continued)

FOREIGN PATENT DOCUMENTS

| | | | |
|---|---|---|---|
| EP | 547279 A1 * | 6/1993 | |
| WO | 0055506 | 9/2000 | |

OTHER PUBLICATIONS

European Search Report and Written Opinion for European Application No. 11174386.0 dated Jan. 31, 2014.

*Primary Examiner* — Allana Lewin
*Assistant Examiner* — Raheena Rehman
(74) *Attorney, Agent, or Firm* — Carlson, Gaskey & Olds, P.C.

(57) ABSTRACT

An example compressor arrangement includes a first compressor portion configured to compress a fluid and a second compressor portion configured to compress the fluid more than the first compressor portion. The compressor arrangement also includes a motor disposed between the first compressor portion and the second compressor portion. The first compressor portion is configured to communicate the fluid to the second compressor portion along a primary flow path. The second compressor portion is configured to divert at least some of the fluid from the primary flow path, communicating the diverted fluid back to the first compressor portion along a secondary flow path.

25 Claims, 2 Drawing Sheets

(56) References Cited

U.S. PATENT DOCUMENTS

| | | |
|---|---|---|
| 7,394,175 B2 | 7/2008 | McAuliffe et al. |
| 7,575,421 B2 | 8/2009 | McAuliffe et al. |
| 7,732,953 B2 | 6/2010 | Telakowsi |
| 7,758,320 B2 * | 7/2010 | Pham et al. .................. 417/366 |
| 7,819,641 B2 | 10/2010 | Decker et al. |
| 8,061,151 B2 * | 11/2011 | Telakowski et al. ............ 62/115 |
| 2006/0061222 A1 | 3/2006 | McAuliffe et al. |
| 2007/0018516 A1 | 1/2007 | Pal et al. |
| 2008/0219844 A1 * | 9/2008 | Decker et al. .............. 415/219.1 |
| 2009/0044548 A1 * | 2/2009 | Masoudipour et al. ......... 62/115 |
| 2009/0205362 A1 * | 8/2009 | Haley .............................. 62/510 |

\* cited by examiner

CENTRIFUGAL COMPRESSOR COOLING PATH ARRANGEMENT

BACKGROUND

This disclosure relates generally to cooling systems and, more specifically, to centrifugal compressors used within the cooling systems.

A cooling system of an aircraft typically includes evaporator, compressor, and condenser sections. The evaporator section communicates a fluid to the compressor section. In the compressor section, the fluid is compressed in a first compressor portion, communicated past a motor, and then compressed further in a second compressor portion. The compressor section outputs the compressed fluid from the second compressor portion to the condenser, which expands the compressed fluid to remove thermal energy from the aircraft as is known.

In some cooling systems, the motor drives the first compressor portion and the second compressor portion. Bearings, such as journal bearings and thrust bearings, support the motor. The motor and bearings generate thermal energy. External hardware such as heat exchangers, fans, and external hoses are often used to cool the motor, bearings, and other compressor components.

SUMMARY

An example compressor arrangement includes a first compressor portion configured to compress a fluid and a second compressor portion configured to compress the fluid more than the first compressor portion. The compressor arrangement also includes a motor disposed between the first compressor portion and the second compressor portion. The first compressor portion is configured to communicate the fluid to the second compressor portion along a primary flow path. The second compressor portion is configured to divert at least some of the fluid from the primary flow path and to communicate the diverted fluid back to the first compressor portion along a secondary flow path.

An example centrifugal compressor of an aircraft cooling system includes a first compressor portion configured to compress a fluid and having an intake. The centrifugal compressor also includes a second compressor portion configured to compress the fluid more than the first compressor portion. A motor is disposed between the first compressor portion and second compressor portion along an axis. The first compressor portion has an intake, and the second compressor portion has an exit. The centrifugal compressor has a primary flow path extending from the intake to the exit and configured to communicate fluid through the first compressor portion, the motor, and the second compressor portion. An inlet is provided in the second compressor portion. The inlet communicates fluid diverted from the primary flow path to a secondary flow path, which communicates the diverted fluid back to the first compressor portion.

An example method for cooling a compressor includes providing fluid to a compressor intake. The fluid is communicated through a first compressor portion and a second compressor portion along a primary flow path. The fluid is then diverted from the primary flow path to at least one secondary flow path at an inlet in the second compressor portion. The diverted fluid is communicated along the at least one secondary flow path to an outlet in the first compressor portion. The fluid is then returned from the secondary flow path to the primary flow path at the outlet in the first compressor portion.

These and other features of the present invention can be best understood from the following specification and drawings, the following of which is a brief description.

DETAILED DESCRIPTION

Figure 1:
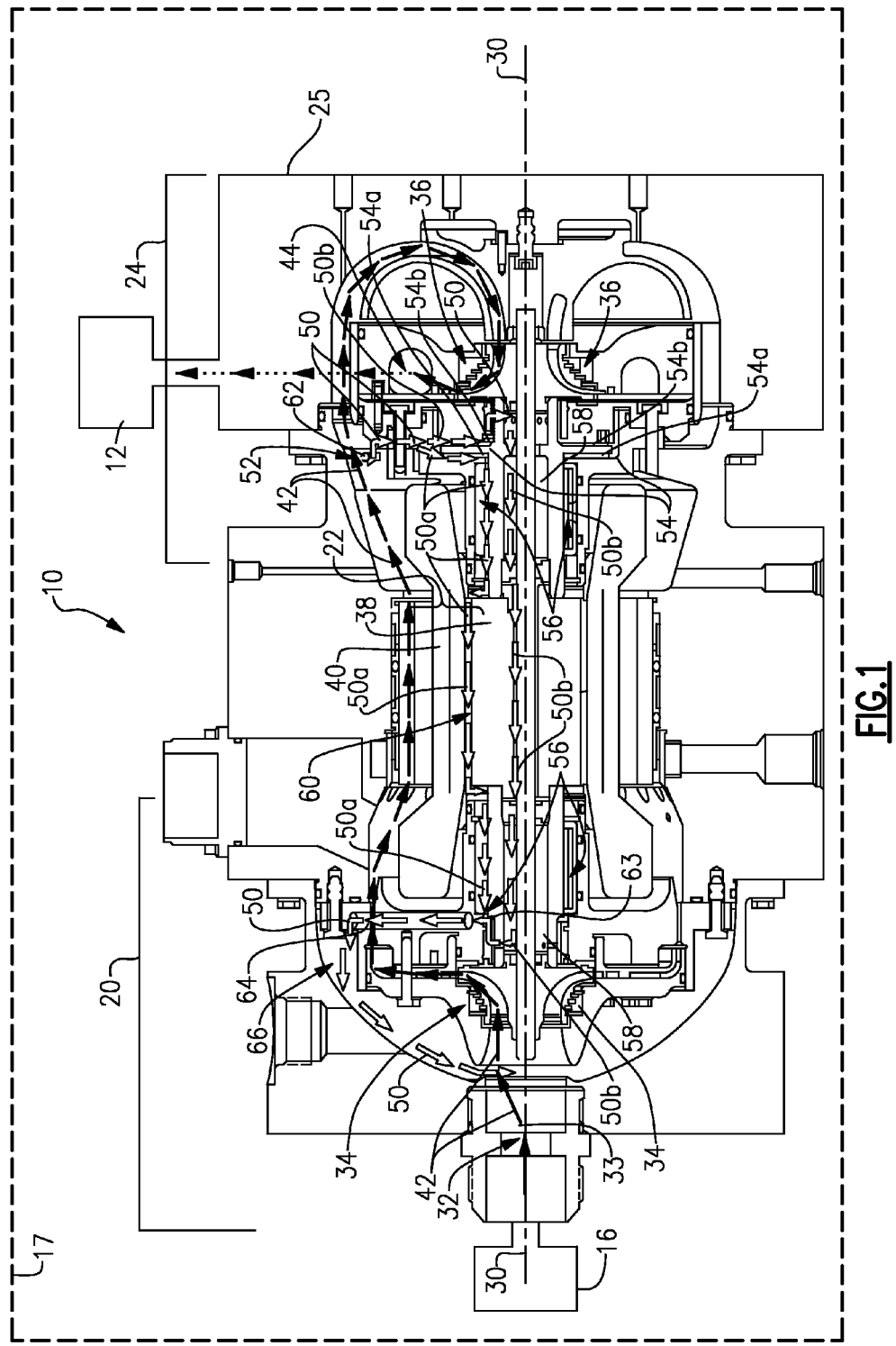
FIG. 1 shows a sectional view of an example compressor having a primary flow path and a secondary flow path.

Referring to FIG. 1, an example centrifugal compressor 10 is in fluid communication with a condenser 12 and an evaporator 16. In this example, the compressor 10, condenser 12, and evaporator 16 form a portion of a vapor cooling system within an aircraft 17.

The example compressor 10 includes a first compressor portion 20, a motor 22, and a second compressor portion 24 each housed within a compressor housing 25. The first compressor portion 20, motor 22, and the second compressor portion 24 are axially aligned along an axis 30. A compressor intake 32 fluidly connects the first compressor portion 20 of the compressor 10 to the evaporator 16. A compressor exit 44 in the second compressor portion 24 is configured to communicate fluid from the compressor 10 to the condenser 12.

In this example, the first compressor portion 20 and the second compressor portion 24 each include compressor rotors 34 and 36. Rotation of the rotors 34 and 36 compresses the fluid in a known manner.

The motor 22 includes a motor rotor 38 and a motor stator 40. The motor stator 40 is radially outward of the motor rotor 38. The motor rotor 38 and motor stator 40 are located adjacent to, and are in fluid communication with, the first compressor portion 20 and the second compressor portion 24 of the compressor 10.

In this example, fluid travels through the compressor 10 along a primary flow path 42 that begins at the compressor intake 32 and ends at the compressor exit 44. The primary flow path 42 extends through the compressor rotors 34 of the first compressor portion 20, the motor stator 40, and the compressor rotors 36 of the second compressor portion 24. The primary flow path 42 is contained within the housing.

The pressure and temperature of the fluid increases as the fluid flows along the primary flow path 42. In this example, the fluid experiences an initial increase in pressure and temperature in the first compressor portion 20 and a subsequent increase in pressure and temperature in the second compressor portion 24.

In one example, the fluid is a refrigerant, such as R-134A. Other examples use other refrigerants and fluids.

In this example, some of the fluid is diverted from the primary flow path 42 and used to cool the compressor 10. The diverted fluid moves through an inlet 52 to a secondary flow path 50. The fluid communicates through the secondary flow path to cool the second compressor portion 24, the motor 22, and the first compressor portion 20.

The secondary flow path 50 begins at the inlet 52, which is located along the primary flow path 42. The secondary flow path 50 ends at an outlet 33 in the first compressor portion 20. The outlet 33 is located along the primary flow path 42. Notably, the pressure at the inlet 52 is higher than the pressure at the outlet 33, which causes fluid to flow through the secondary flow path 50 from the inlet 52 to the outlet 33.

In this example, the inlet 52 includes a first opening 62 that communicates fluid between the primary flow path 42 and the secondary flow path 50. The opening 62 is sized to prevent leakage and improve overall performance while communicating an appropriate amount of flow to the secondary flow path 50.

In one example, a drill establishes the opening 62 in the second compressor portion 24 of the compressor 10. Other examples form the opening 62 in other ways such as by punching the opening.

In this example, the temperature and pressure of the fluid flowing through the primary flow path 42 near the inlet 52 is acceptable for providing cooling to thrust bearings 54, journal bearings 56, the motor rotor 38, and the motor shaft 58. That is, the fluid is capable of transporting thermal energy away from these components.

After the fluid moves through the opening 62 at the inlet 52, the fluid flows in a generally radial inward direction toward the thrust bearings. Before reaching the thrust bearings 54, the secondary flow path 50 splits into a first flow branch 50a and a second flow branch 50b. The first flow branch 50a is configured to communicate fluid through a first cavity 54a of the thrust bearings 54 in the second compressor portion 24.

The example first flow branch 50a then turns to follow an axially forward direction and extends through the journal bearings 56 of the second compressor portion 24. The first flow branch 50a is then configured to communicate fluid through a circumferential gap 60 defined between the motor rotor 38 and the motor stator 40. The first flow branch 50a then communicates fluid to journal bearings 56 of the first compressor portion 20.

The example second flow branch 50b is configured to communicate fluid through a second cavity 54b of the thrust bearings 54 in the second compressor portion 24. The second flow branch 50b extends from the thrust bearings 54 in an axially forward direction. The second flow branch 50b communicates fluid from this position through the inner diameter of the motor shaft 58 in the second compressor portion 24, the motor rotor 38, and the motor shaft 58 in the first compressor portion 20.

After the first flow branch 50a flows through the journal bearings 56 of the first compressor portion 20 and the second flow branch 50b flows through the motor shaft 58 in the first compressor portion 20, fluid from the first flow branch 50a and the second flow branch 50b combines at a combination position 63. The secondary flow path 50 communicates fluid from the combination position 63 through a second opening 64 in a radially outward direction, and then through an exhaust 66. The fluid in the secondary flow path 50 is returned to the primary flow path 42 at the outlet 33. The fluid moving through the secondary flow path 50 is then reintegrated into the primary flow path 42 for re-use within the compressor 10.

Figure 2:
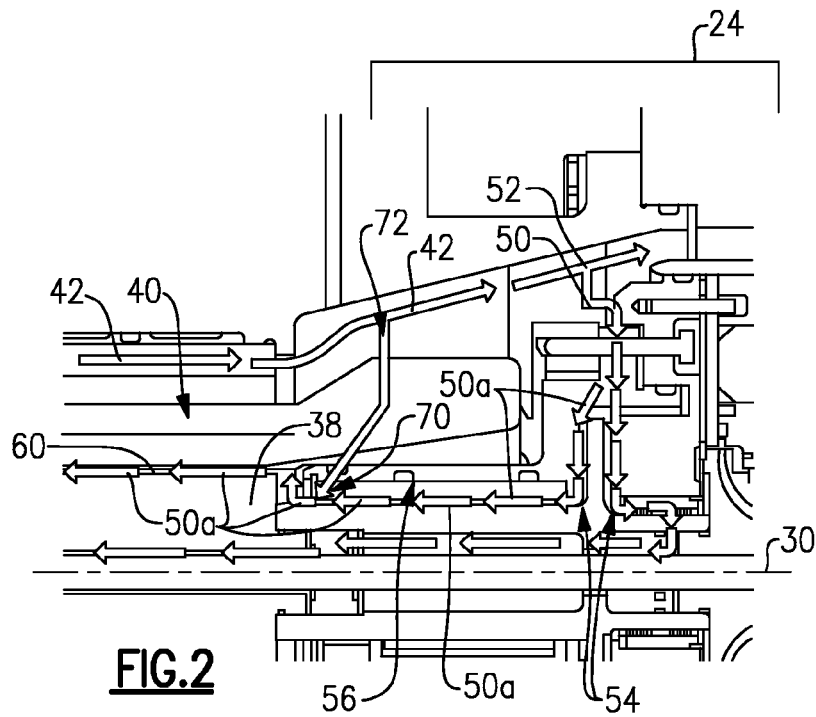
FIG. 2 shows a close-up sectional view of another example compressor having a primary flow path and a secondary flow path.

Referring to FIG. 2, in another example, the primary flow path 42 communicates fluid to the first flow branch 50a of the secondary flow path 50 at a second inlet 70. This fluid is communicated from the second inlet 70 on the primary flow path 42 to the first flow branch 50a through a third opening 72, which is sized to prevent any reversal or stagnation of flow in the first flow branch 50a when communicating fluid to the first flow branch 50a. In this example, the second inlet 70 is between the journal bearings 56 of the second compressor portion 24 and the motor rotor 38 and motor stator 40.

After fluid communicates to the first flow branch 50a at the second inlet 70, the fluid combines with the fluid of the first flow branch 50a and continues along the first flow branch 50a.

Injecting additional fluid in the first flow branch 50a after the first flow branch 50a has passed through the thrust bearings 54 and journal bearings 56 mitigates fluid temperature increases due to cooling of the thrust bearings 54 and journal bearings 56. Providing additional fluid at the second inlet 70 also reduces fluid pressure within the cooling path defined by the primary flow path 42 and the secondary flow path 50 as well as associated performance losses.

Figure 3:
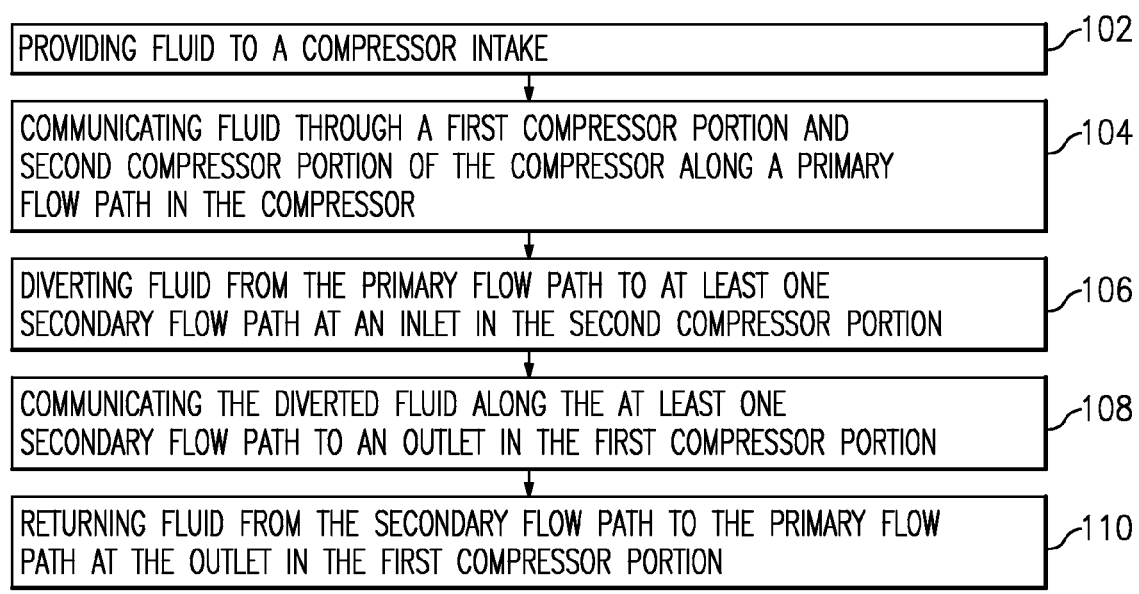
FIG. 3 shows an example method for cooling a compressor using a secondary flow path.

Referring to FIG. 3, an example method for cooling a compressor includes providing fluid to a compressor intake at a step 102. The fluid is then communicated through a first compressor portion and a second compressor portion via a primary flow path in the compressor at a step 104. The fluid is next diverted from the primary flow path to at least one secondary flow path in the compressor at an inlet at a step 106. The inlet is in the second compressor portion in this example. The fluid is then communicated through the at least one secondary flow path in the compressor to an outlet in the first compressor portion at a step 108. After flowing through the at least one secondary flow path, the fluid is returned from the at least one secondary flow path back to the primary flow path at the outlet in the first compressor section at a step 110.

Although preferred embodiments have been disclosed, a worker of ordinary skill in this art would recognize that certain modifications would come within the scope of this disclosure. For that reason, the following claims should be studied to determine the true scope and content of this disclosure.

What is claimed is:

1. A compressor arrangement comprising:
a first compressor portion configured to compress a fluid;
a second compressor portion configured to compress the fluid more than the first compressor portion;
a motor disposed between the first compressor portion and the second compressor portion, wherein the first compressor portion is configured to communicate the fluid to the second compressor portion along a primary flow path, and the second compressor portion is configured to divert a portion of the fluid from the primary flow path within the second compressor portion and to communicate the diverted fluid back to the first compressor portion along a secondary flow path, wherein the portion is less than one hundred percent of the fluid from the primary flow path; and
wherein fluid entering the secondary flow path is drawn from within the second compressor portion.

2. The compressor of claim 1, wherein the secondary flow path communicates the diverted fluid to remove thermal energy from at least one component within the compressor.

3. The compressor of claim 2, wherein the at least one component is selected from a group comprising a thrust bearing, a journal bearing, a motor rotor, a motor stator, and a motor shaft.

4. The compressor of claim 1, wherein fluid flows along the secondary flow path from an inlet in the second compressor portion to an outlet in the first compressor portion.

5. The compressor of claim 4, wherein a pressure differential between the inlet in the second compressor portion and the outlet in the first compressor portion provides fluid flow from the inlet to the outlet.

6. The compressor of claim 1, wherein the fluid is refrigerant.

7. The compressor of claim 1, wherein the motor establishes at least a portion of the secondary flow path.

8. The compressor of claim 1, wherein the secondary compressor portion includes a primary flow path outlet and a secondary flow path inlet.

9. The compressor of claim 8, wherein said secondary compressor is configured to impel the fluid through the primary flow path outlet and the secondary flow path inlet simultaneously.

10. The compressor of claim 1, wherein the first compressor portion includes a primary flow path inlet and a secondary flow path outlet.

11. The compressor of claim 1, wherein the secondary flow path comprises a fluid outlet located upstream of a rotor portion of the first compressor portion.

12. A centrifugal compressor of an aircraft cooling system comprising:
a first compressor portion configured to compress a fluid, the first compressor portion including an intake;
a second compressor portion configured to compress the fluid more than the first compressor portion, the second compressor portion including an exit; and
a motor disposed between the first compressor portion and second compressor portion along an axis, a primary flow path extends from the intake to the exit, the primary flow path configured to communicate fluid through the first compressor portion, the motor, and the second compressor portion, wherein the second compressor portion includes an inlet that communicates fluid diverted from the primary flow path within the second compressor portion to a secondary flow path that is configured to communicate the diverted fluid back to an outlet at the first compressor portion.

13. The centrifugal compressor of claim 12, wherein a pressure differential between the inlet and the outlet causes fluid flow between the inlet to the outlet.

14. The centrifugal compressor of claim 13, wherein the secondary flow path is configured to communicate fluid from the inlet to an outlet in the first compressor portion, the outlet configured to communicate the diverted fluid back to the primary flow path.

15. The centrifugal compressor of claim 14, wherein the secondary flow path includes a first flow branch and a second flow branch.

16. The centrifugal compressor of claim 15, wherein the first flow branch is configured to communicate fluid through a cavity defined between a motor rotor and a motor stator.

17. The centrifugal compressor of claim 15, wherein the first flow branch is configured to communicate fluid through thrust bearings and journal bearings.

18. The centrifugal compressor of claim 16 wherein the second flow branch is configured to communicate fluid through a shaft of the motor rotor.

19. The centrifugal compressor of claim 13, wherein the primary flow path is configured to communicate fluid to the secondary flow path at a second inlet in the second compressor portion, the second inlet spaced from the other inlet.

20. The centrifugal compressor of claim 19, wherein fluid is communicated directly from a second inlet to the motor.

21. The centrifugal compressor of claim 13, wherein the secondary flow path is entirely within a compressor housing.

22. The centrifugal compressor of claim 12, wherein the secondary flow path comprises a fluid outlet located upstream of a rotor portion of the first compressor portion.

23. A method for cooling a compressor comprising:
providing fluid to a compressor intake;
communicating fluid through a first compressor portion and a second compressor portion along a primary flow path in the compressor;
diverting fluid from the primary flow path within the second compressor portion to at least one secondary flow path in the compressor at an inlet in the second compressor portion;
communicating the diverted fluid along the at least one secondary flow path to an outlet in the first compressor portion; and
returning fluid from the secondary flow path to the primary flow path at the outlet in the first compressor portion.

24. The method of claim 23, further comprising the step of separating the secondary flow path into a first flow branch and a second flow branch.

25. The method of claim 24, further comprising the step of communicating fluid from the primary flow path to the first flow branch at a second inlet axially forward of thrust bearings and journal bearings of the second compressor portion and axially rear of a motor.

* * * * *